(12) United States Patent
Nishina et al.

(10) Patent No.: US 7,617,672 B2
(45) Date of Patent: Nov. 17, 2009

(54) ENGINE EXHAUST EMISSION CONTROL DEVICE AND EXHAUST EMISSION CONTROL METHOD

(75) Inventors: Mitsuhiro Nishina, Ageo (JP); Hiroyuki Kurita, Ageo (JP); Toshikazu Katou, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 367 days.

(21) Appl. No.: 10/574,346

(22) PCT Filed: Sep. 13, 2004

(86) PCT No.: PCT/JP2004/013306

§ 371 (c)(1),
(2), (4) Date: Nov. 28, 2006

(87) PCT Pub. No.: WO2005/033483

PCT Pub. Date: Apr. 14, 2005

(65) Prior Publication Data

US 2007/0113544 A1 May 24, 2007

(30) Foreign Application Priority Data

Oct. 3, 2003 (JP) ............................. 2003-345723

(51) Int. Cl.
*F01N 3/18* (2006.01)
(52) U.S. Cl. .............................. 60/277; 60/286; 60/295
(58) Field of Classification Search .................... 60/286, 60/295, 301, 277; 123/406.48, 568.11
See application file for complete search history.

(56) References Cited

U.S. PATENT DOCUMENTS

2003/0164163 A1* 9/2003 Lei et al. ............... 123/568.14

FOREIGN PATENT DOCUMENTS

| JP | 2000-027627 | 1/2000 |
| JP | 2000-297704 | 10/2000 |
| JP | 2000297704 A | * 10/2000 |
| JP | 2002-371831 | 12/2002 |
| JP | 2003-254048 | 9/2003 |
| JP | 2003-529011 | 9/2003 |
| WO | WO 0075643 | * 12/2000 |

OTHER PUBLICATIONS

U.S. Appl. No. 12/177,852, filed Jul. 22, 2008, Exhaust Emission Purifying Apparatus For Engine.

(Continued)

*Primary Examiner*—Thomas E Denion
*Assistant Examiner*—Jonathan Matthias
(74) *Attorney, Agent, or Firm*—McDermott Will & Emery LLP (57) ABSTRACT

An engine C/U 51 detects an abnormality which has occurred in an engine, and outputs a signal that indicates the occurrence of this abnormality to an SCR-C/U 61. The SCR-C/U 61 increases and decreases the urea water injection quantity corresponding to the abnormality which has occurred. On the other hand, the SCR-CU 61 detects an abnormality that has occurred in the SCR device, and outputs a signal that indicates the occurrence of this abnormality to an engine C/U 51. The engine C/U 51 controls an engine part such as an EGR valve, to reduce the NOx emission amount.

18 Claims, 6 Drawing Sheets

OTHER PUBLICATIONS

U.S. Appl. No. 10/577,222, filed Nov. 28, 2006, Exhaust Gas Purifying Apparatus And Exhaust Gas Purifying Method Of An Engine.

U.S. Appl. No. 11/790,739, filed Apr. 27, 2007, Exhaust Emission Purifying Apparatus For Engine.

U.S. Appl. No. 11/800,450, filed May 4, 2007, Exhaust Gas Purification Apparatus.

U.S. Appl. No. 11/812,871, filed Jun. 22, 2007, Exhaust Emission Purifying Apparatus For Engine.

U.S. Appl. No. 11/952,397, filed Dec. 7, 2007, Exhaust Gas Purifying Apparatus For Engine.

U.S. Appl. No. 12/173,783, filed Jul. 15, 2008, Exhaust Emission Purifying Apparatus For Engine.

U.S. Appl. No. 12/173,791, filed Jul. 15, 2008, Atmospheric Temperature Detecting Apparatus And Exhaust Emission Purification Apparatus.

* cited by examiner

ENGINE EXHAUST EMISSION CONTROL DEVICE AND EXHAUST EMISSION CONTROL METHOD

This application is a 35 U.S.C. 371 of PCT/JP2004/013306, filed on Sep. 13, 2004.

BACKGROUND OF THE INVENTION

1. Field of the Invention

The present invention relates to an engine exhaust emission control device and exhaust emission control method, and in particular, to technology for purifying nitrogen oxides discharged from a vehicle engine, using ammonia as a reducing agent.

2. Description of the Related Art

As a device for purifying air pollutants discharged from an engine, in particular nitrogen oxides (referred to hereafter as "NOx") in exhaust gas, using a secondary-treatment, the following SCR (Selective Catalytic Reduction) device is known. This SCR device is installed in an exhaust gas passage of an engine, and includes an injection nozzle that injects an aqueous solution of ammonia or a precursor thereof. The ammonia injected by this injection nozzle functions as a reducing agent, and reacts with NOx on a catalyst, to reduce and purify the NOx. Moreover, as an SCR device that addresses ease of storage of ammonia on a vehicle, the following device is known. This SCR device is provided with a tank that stores urea water as an ammonia precursor, and at the time of actual operation, injects the urea water supplied from this tank into the exhaust gas passage, so as to produce ammonia from hydrolysis of the urea using exhaust heat (Japanese Unexamined Patent Publication No. 2000-027627 (paragraph number 0013)). Generally, engine operating conditions such as engine speed and load are detected, and urea water in an amount corresponding to the detected operating conditions, is injected into the exhaust gas (Japanese Unexamined Patent Publication No. 2001-020724 paragraph number 0004)).

However, in the above SCR device there are the following problems. As a setting related to an engine operation, there is a case where operating characteristics of an engine part such as a fuel injection valve are set in order to particularly reduce a particulate emission amount. In such a setting, generally a NOx emission amount increases. If the SCR device is operating normally, the discharged NOx can be purified by a reduction reaction with ammonia. Based on such a setting that permits NOx emission to some degree, a case where an abnormality has occurred in an engine part and the composition of the exhaust gas has changed is assumed. In this case, if the urea water injection quantity is maintained at the normal level irrespective of an increase in the NOx emission amount, then the ammonia becomes insufficient with respect to the NOx, and unpurified NOx is discharged into the atmosphere. On the other hand, if the urea water injection quantity is maintained at the normal level irrespective of a decrease in the NOx emission amount, then not only will the urea water be consumed unnecessarily, but excessive ammonia will be generated and the surplus ammonia will be discharged into the atmosphere. Furthermore, it is assumed that an abnormality has occurred in the SCR device, and the urea water injection quantity has changed, or the ammonia content amount in the urea water (that is, the urea concentration) has changed. In this case, since the ammonia addition amount to the exhaust gas changes, the proportion of NOx and ammonia deviates from an optimal value, and the reduction reaction does not proceed well, so that the NOx removal rate will not meet requirements. When ammonia is excessively added due to an abnormality in the SCR device, the surplus ammonia is discharged into the atmosphere.

SUMMARY OF THE INVENTION

An object of the present invention is to suppress the discharge of NOx and ammonia into the atmosphere when an abnormality occurs in an engine part or an SCR device.

The present invention provides an engine exhaust emission control device and exhaust emission control method.

The device and method according to the present invention is provided with an addition device for adding a NOx reducing agent to exhaust gas, and uses the reducing agent added by this addition device to promote a reduction of NOx in the exhaust gas. The present invention can be appropriately applied to a vehicle engine, and ammonia can be used for the NOx reducing agent.

In one embodiment of the present invention, an abnormality that occurs in the addition device is detected as a first abnormality. By manipulating an engine control factor that influences the composition of exhaust gas at the point in time of emission from a cylinder (hereafter simply referred to as "engine control factor"), the NOx emission amount of the engine under the same operating condition is made vary in the case where the first abnormality occurrence is detected, from in other cases.

In another embodiment of the present invention, an abnormality that occurs in an engine part for realizing the engine control factor is detected as a second abnormality. The amount of the reducing agent to be added by the addition device is made vary in the case where the second abnormality is detected, from in other cases.

In yet another embodiment of the present invention, the occurrence of the first abnormality is detected, and the occurrence of the second abnormality is detected. Times other than when an occurrence of at least one of either the first or second abnormalities is detected, are assumed to be normal times. The engine control factor is manipulated at the time of the occurrence of the first abnormality where the occurrence of the first abnormality is detected, to make the NOx emission amount of the engine vary from that at normal times under the same operating conditions of the engine. Moreover, at the time of the second abnormality occurrence where the occurrence of the second abnormality is detected, the amount of the reducing agent to be added by the addition device is made vary from that at normal times.

According to the present invention, when an abnormality occurs in an engine part, and the NOx emission amount of the engine changes, an amount of the reducing agent to be added by the addition device can be controlled to counterbalance the actual NOx emission amount. Therefore, discharge of NOx due to an insufficient supply of the reducing agent, and discharge of the reducing agent due to an excessive supply, can be prevented. Moreover, when an abnormality occurs in the addition device, and the device becomes unable to add an accurate amount of the reducing agent, the engine control factor can be manipulated to suppress NOx formation itself. Therefore discharge of NOx can be suppressed.

Other objects and aspects relating to the present invention can be understood from the following description with reference to the appended drawings.

The entire content of a Japanese Patent Application (No. 2003-345723), which is the basis for a priority claim, is incorporated as a part of the present application and is referenced.

DESCRIPTION OF THE PREFERRED EMBODIMENTS

Hereunder, an embodiment of the present invention is described with reference to the drawings.

Figure 1:
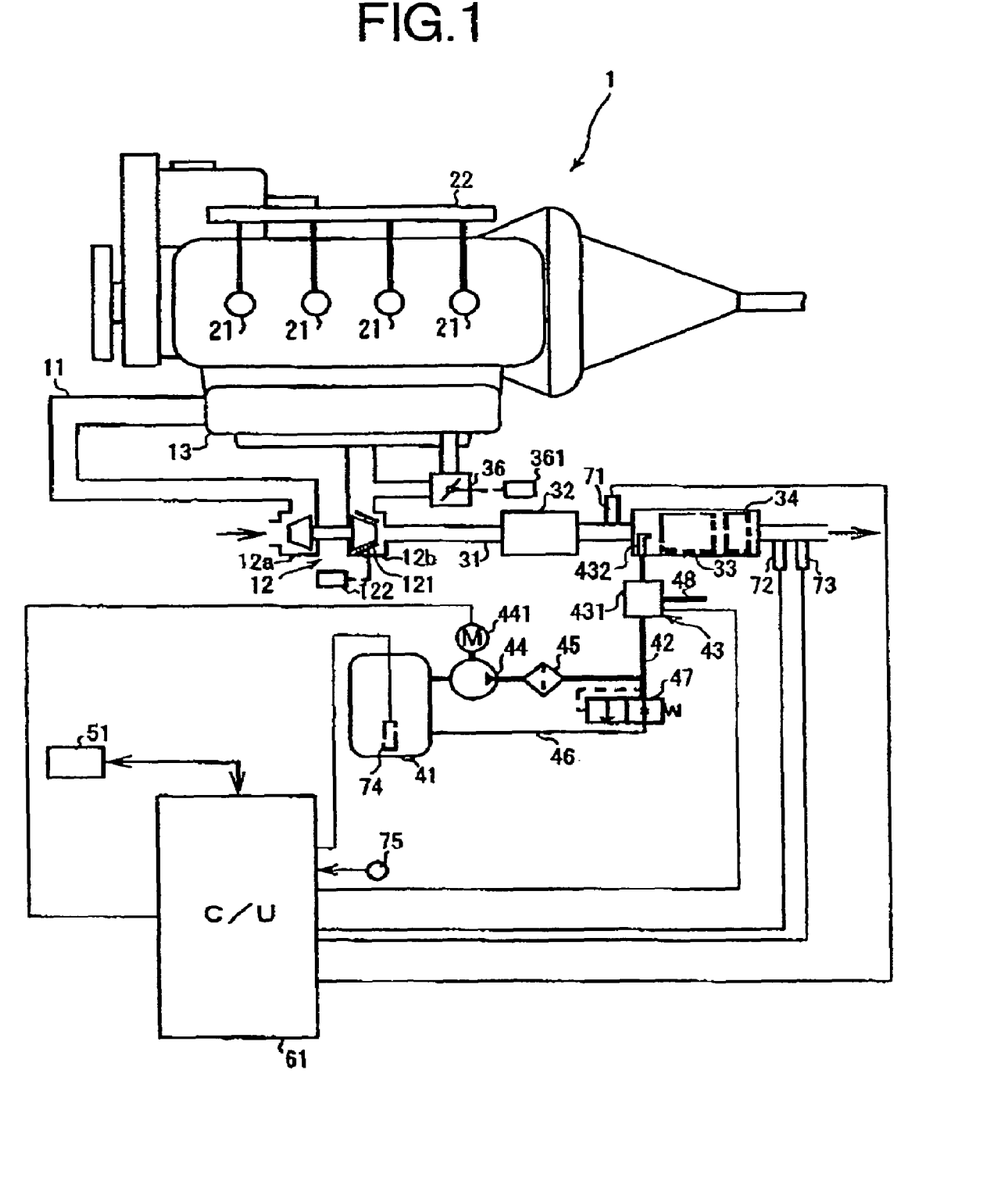
FIG. 1 shows a configuration of an engine according to one embodiment of the present invention.

FIG. 1 shows a configuration of a motor vehicle engine (hereunder referred to as an "engine") according to one embodiment of the present invention. In the present embodiment, a direct injection type diesel engine is used as an engine 1.

An air cleaner (not shown in the diagram) is fitted to an induction part of an intake air passage 11, and dust in the intake air is removed by the air cleaner. A compressor 12a of a variable nozzle type turbocharger 12 (which constitutes a "supercharger" in the present embodiment) is arranged in the intake air passage 11, and the intake air is compressed and discharged by the compressor 12a. The compressed intake air flows into a surge tank 13, and is distributed to respective cylinders in a manifold part.

In the engine main body, injectors 21 are installed on the cylinder head for each cylinder. The injectors 21 operate in accordance with signals from an engine control unit 51 (hereunder referred to as the "engine C/U"). Fuel which has been fed by a fuel pump (not shown in the diagram), is supplied to the injectors 21 through a common rail 22, and is injected into the combustion chambers by the injectors 21.

In an exhaust passage 31, a turbine 12b of the turbocharger 12 is installed downstream of the manifold part. The turbine 12b is driven by exhaust gas to thereby rotate the compressor 12a. In the turbine 12b, the angle of variable vanes 121 is controlled by a VNT control unit 122. The rotating speed of the turbine 12b and the compressor 12a changes according to the angle of the variable vanes 121.

Downstream of the turbine 12b, an oxidation catalyst 32, a NOx purification catalyst 33 and an ammonia purification catalyst 34 are installed in this order from the upstream side. The oxidation catalyst 32 oxidizes hydrocarbon and carbon monoxide in the exhaust gas, and converts nitrogen monoxide (hereunder referred to as "NO") in the exhaust gas into NOx, which is composed primarily of nitrogen dioxide (hereunder referred to as "NO2"). This has an effect of adjusting a proportion of NO and NO2 contained in the exhaust gas to the optimal proportion for a NOx reduction reaction described later. The NOx purification catalyst 33 reduces NOx in the exhaust gas and purifies it. In order to promote NOx reduction with the NOx purification catalyst 33, in the present embodiment, ammonia is added to the exhaust gas upstream of the NOx purification catalyst 33 as a reducing agent.

In the present embodiment, in consideration of facilitating ammonia storage, urea is stored in an aqueous solution state as an ammonia precursor. By storing ammonia as urea, safety can be ensured.

A urea water supply pipe 42 is connected to a tank 41 that stores urea water, and a urea water injection nozzle 43 is fitted to a tip portion of the urea water supply pipe 42. A feed pump 44 and a filter 45 are installed on the urea water supply pipe 42 in this order from the upstream side. The feed pump 44 is driven by an electric motor 441. The speed of the electric motor 441 is controlled by signals from an SCR control unit 61 (Hereunder "SCR-C/U"), to adjust the discharge rate of the feed pump 44. Moreover, downstream of the filter 45, a urea water return pipe 46 is connected to the urea water supply pipe 42. The urea water return pipe 46 is configured with a pressure control valve 47 installed therein so that surplus urea water above a specified pressure returns to the tank 41.

The injection nozzle 43 is an air assist type injection nozzle, and includes a main body 431, and a nozzle portion 432. The urea water supply pipe 42 is connected to the main body 431, and an air supply pipe 48 for supplying air for assisting injection (the supplied air being referred to as "assist air", hereafter) is also connected the main body 431. The air supply pipe 48 is connected to an air tank (not shown in the diagram), and assist air is supplied from this air tank. The nozzle portion 432 is installed so as to pass through a casing of the NOx purification catalyst 33 and ammonia purification catalyst 34, upstream of the NOx purification catalyst 33. The injection direction of the nozzle portion 432 is set in a direction parallel with the exhaust gas flow and facing an end surface of the NOx purification catalyst 33.

When urea water is injected, urea in the injected urea water is hydrolyzed by the exhaust heat, and ammonia is produced. The produced ammonia acts as a NOx reducing agent on the NOx purification catalyst 33, and promotes NOx reduction. The ammonia purification catalyst 34 is for purifying slipped ammonia that has passed through the NOx purification catalyst 33 without contributing to NOx reduction. Since ammonia has a pungent odor, it is preferable not to discharge ammonia that has not been purified. The oxidation reaction of NO in the oxidation catalyst 32, the hydrolysis reaction of urea, the reduction reaction of NOx in the NOx purification catalyst 33, and the oxidation reaction of slipped ammonia in the ammonia purification catalyst 34, are expressed by the following expressions (1) to (4). In the present embodiment, the NOx purification catalyst 33 and the ammonia purification catalyst 34 are installed in one housing, however they may be configured to be respectively installed in separate housings.

$$NO + \tfrac{1}{2}O_2 \rightarrow NO_2 \tag{1}$$

$$(NH_2)_2CO + H_2O \rightarrow 2NH_3 + CO_2 \tag{2}$$

$$NO + NO_2 + 2NH_3 \rightarrow 2N_2 + 3H_2O \tag{3}$$

$$4NH_3 + 3O_2 \rightarrow 2N_2 + 6H_2O \tag{4}$$

Furthermore, the exhaust gas passage 31 is connected to the intake air passage 11 via an EGR pipe 35. Exhaust gas is recirculated to the intake air passage 11 through this EGR pipe 35. An EGR valve 36 is installed in the EGR pipe 35, and this EGR valve 36 controls the flow rate of the recirculating exhaust gas. The opening of the EGR valve 36 is controlled by an EGR control unit 361. An exhaust gas recirculation device in the present embodiment is configured by the EGR pipe 35 and the EGR valve 36.

In the exhaust gas passage 31, a temperature sensor 71 for detecting the temperature of the exhaust gas prior to addition of urea water is installed between the oxidation catalyst 32 and the NOx purification catalyst 33. A temperature sensor 72 for detecting the temperature of the exhaust gas after reduction, and a NOx sensor 73 for detecting the concentration of NOx contained in the exhaust gas after reduction, are installed downstream of the ammonia purification catalyst 34. Moreover, a urea sensor 74 for detecting the concentration Du (hereunder "concentration" simply refers to urea concentration) of the urea contained in the stored urea water, and a residual quantity sensor 75 for detecting a quantity Ru of the stored urea water, are arranged inside the tank 41.

For the urea sensor 74 (corresponding to a "first sensor" in the present embodiment), a sensor of any well known form can be used. In the present embodiment, a sensor that detects the concentration Du based on a heat transfer rate of urea water which corresponds to the urea concentration is used. Furthermore, the residual quantity sensor 75 (corresponding to a "second sensor") is configured to include a float, and a variable resistor that detects the position of the float (that is, the "level"), and a residual quantity Ru of urea water is detected based on the detected float level. According to the temperature sensitive urea sensor 74 that detects a concentration Du based on the heat transfer rate of urea water, since there is a significant heat transfer rate difference between urea and air, this can be used to determine whether or not the tank 41 is empty, instead of using the residual quantity Ru, by previously obtaining the output characteristics of the urea sensor 74 for when the urea sensor is in air. As a result the first and second sensors can be realized with the single urea sensor 74.

In the present embodiment, the SCR-C/U 61 corresponds to a "first controller" and the engine C/U 51 corresponds to a "second controller". Furthermore, the tank 41, the urea water supply pipe 42, the injection nozzle 43, the feed pump 44, and the air supply pipe 48 constitute a reducing agent addition device. The urea sensor 74 can have both a function as the first sensor that detects concentration, and a function as the second sensor that determines residual quantity.

Figure 2:
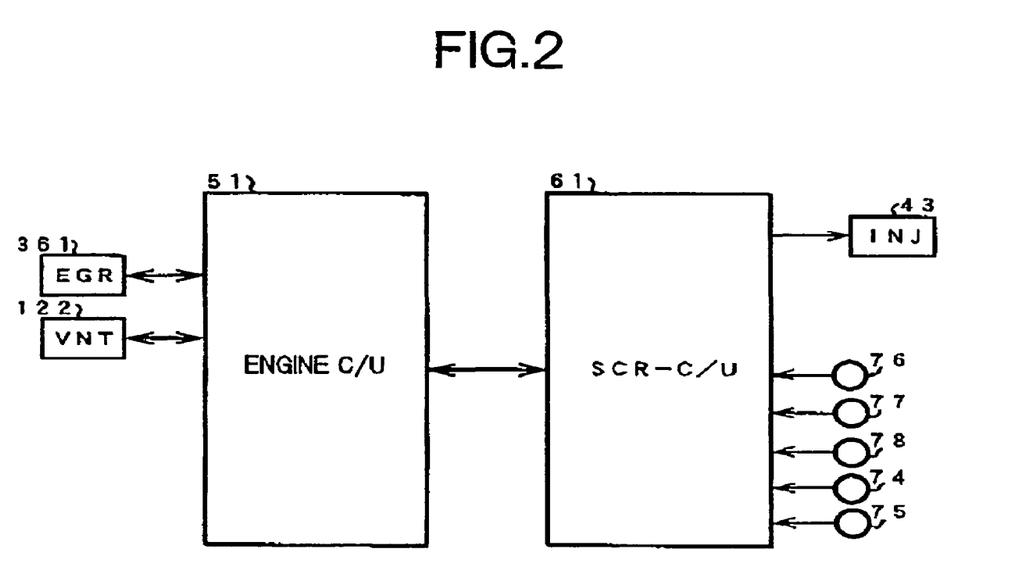
FIG. 2 shows a configuration of a control system for the engine and an exhaust emission control device therefor.

FIG. 2 shows a configuration of a control system of the engine 1.

The engine C/U 51 and the SCR-C/U 61 are connected so as to allow bidirectional communication.

An EGR control unit 361, and a VNT control unit 122 are connected to the engine C/U 51 so as to respectively allow bidirectional communication. The EGR control unit 361 has a function for detecting an abnormality that has occurred in the EGR system, and a signal that indicates the occurrence of this abnormality is output to the engine C/U 51. The VNT control unit 122 has a function for detecting an abnormality that has occurred in the VNT system, and a signal that indicates the occurrence of this abnormality is output to the engine C/U 51. The engine C/U 51 outputs command signals according to the operating conditions of the engine 1, to the EGR control unit 361 and the VNT control unit 122. On the other hand, when signals that indicate the occurrence of abnormalities are received from these control units 361 and 122, an engine side abnormality signal (corresponding to an "addition device control signal" in the present embodiment) that indicates the occurrence of an abnormality in the engine 1 is output to the SCR-C/U 61. Furthermore, an ignition switch, a start switch, a crank angle sensor, a vehicle speed sensor, an accelerator sensor, and the like, are installed in the engine 1, and detection signals from these sensors are output to the engine C/U 51. The engine C/U 51 calculates an engine speed Ne based on the signal input from the crank angle sensor. The engine C/U 51 outputs information required for urea water injection control, such as the injection quantity, to the SCR-C/U 61.

The SCR-C/U 61 receives detection signals from the temperature sensors 71 and 72, the NOx sensor 73, the urea sensor 74, and the residual quantity sensor 75, and computing information for the injection quantity and the like, and receives an assist air pressure Pa, a urea water pressure Pu, and a urea sensor voltage Vs. The assist air pressure Pa is the pressure inside the air supply pipe 48, and is detected by a pressure sensor 76 arranged in the air supply pipe 48. The urea water pressure Pu is the pressure inside the urea water supply pipe 42, and is detected by a pressure sensor 77 arranged in the urea water supply pipe 43 downstream of the feed pump 44. The urea sensor voltage Vs is a voltage output according to the concentration detected by the urea sensor 74, and is detected by a voltage sensor 78. The SCR-C/U 61 computes and sets an optimal urea water injection quantity based on the input signals and information, and outputs a command signal according to the set urea water injection quantity, to the injection nozzle 43. Moreover, the SCR-C/U 61 detects an abnormality that has occurred in the urea water injection system, as described later, based on the assist air pressure Pa, the urea water pressure Pu, the urea sensor voltage Vs, the concentration Dn, and the residual quantity Ru, and outputs an SCR side abnormality signal (corresponds to "engine control signal") indicating the occurrence of this abnormality to the engine C/U 51.

Next, the operation of the engine C/U 51, and the SCR-C/U 61 is described using flow charts.

First, the operation of the SCR-C/U 61 is described.

Figure 3:
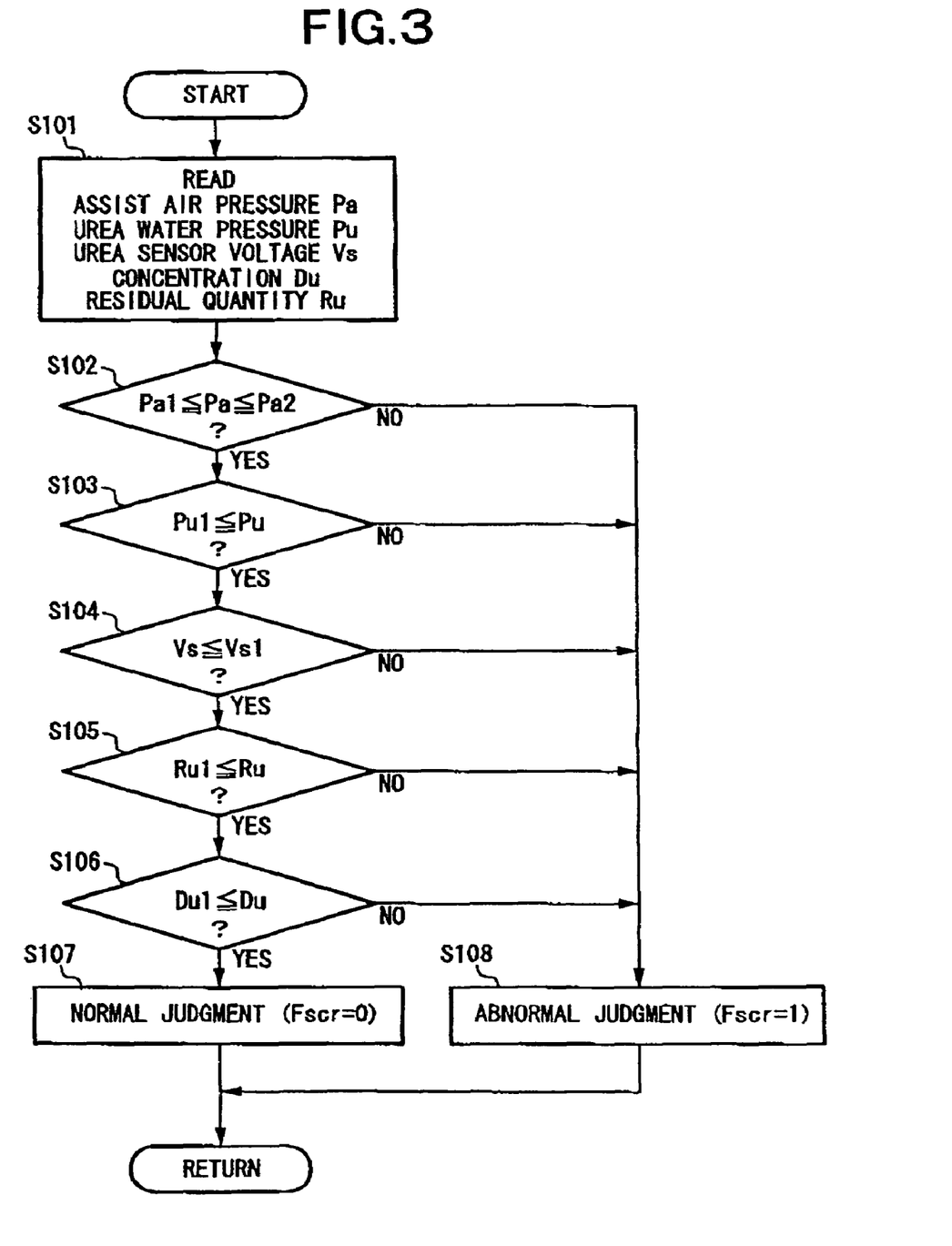
FIG. 3 is a flow chart of an abnormality detection routine performed by an SCR-C/U.

FIG. 3 is a flow chart of an abnormality detection routine. This routine is started by turning on the ignition switch, and is subsequently repeated for each predetermined interval. This routine detects an abnormality that has occurred in the urea water injection system.

In S101, the assist air pressure Pa, the urea water pressure Pu, the urea sensor voltage Vs, the concentration Du, and the residual quantity Ru are read in.

In S102, it is determined whether or not the assist air pressure Pa is within a predetermined range between a predetermined upper limit value Pa2 and a predetermined lower limit value Pa1 (<Pa2). If the assist air pressure Pa is within this range, control proceeds to S103, and if not within this range, control proceeds to S108. When an assist air pressure that is smaller than the value Pa1 is detected, it can be judged that assist air leakage has occurred in the air supply pipe 42, and when an assist air pressure that is greater than the value Pa is detected, it can be judged that clogging has occurred in the injection nozzle 43. Clogging in the injection nozzle 43 occurs when urea solidifies inside the nozzle portion 432, thus blocking the passage.

In S103, it is determined whether or not the urea water pressure Pu is greater than or equal to a predetermined value Pu1. If greater than or equal to the value Pu1, control proceeds to S104, and if smaller than the value Pu1, control proceeds to S108. When a urea water pressure that is smaller than the value Pu1 is detected, it can be judged that the feed pump 44 has failed and is in a state where it cannot supply urea water with sufficient pressure.

In S104, it is determined whether or not the urea sensor voltage Vs is less than or equal to a predetermined value Vs1. If less than or equal to the value Vs1, control proceeds to S105, and if greater than the value Vs1, control proceeds to S108. When a urea sensor voltage that is greater than the value Vs1 is detected, it can be judged that a disconnection has occurred in the urea sensor 74.

In S105, it is determined whether or not the residual quantity Ru is greater than or equal to a predetermined value Ru1. If greater than or equal to the value Ru1, control proceeds to S106, and if smaller than the value Ru1, it is judged that the tank 41 is empty, and the residual quantity is insufficient, and control proceeds to S108. The value Ru1 is set to the minimum residual quantity required for injection.

In S106, it is determined whether or not the concentration Du is greater than or equal to a predetermined value Du1. If greater than or equal to the value Du1, control proceeds to S107, and if smaller than the value Du1, it is judged that the urea water has been excessively diluted, and control proceeds to S108. The value Du1 is set to the minimum concentration required for ammonia addition.

In S107, since the assumed abnormality has not occurred in the urea water injection system, an SCR side abnormality determination flag Fscr is set to 0. In the present embodiment, the assist air leak, the clogging in the injection nozzle 43, the failure in the feed pump 44, the disconnection in the urea sensor 74, the insufficient residual quantity of urea water, and the dilution of the urea water detected as described above, correspond to the "first abnormality".

In S108, since an abnormality of some kind has occurred in the urea water injection system, the SCR side abnormality determination flag Fscr is set to 1, and a warning lamp is operated to inform an operator of the occurrence of the abnormality.

Figure 4:
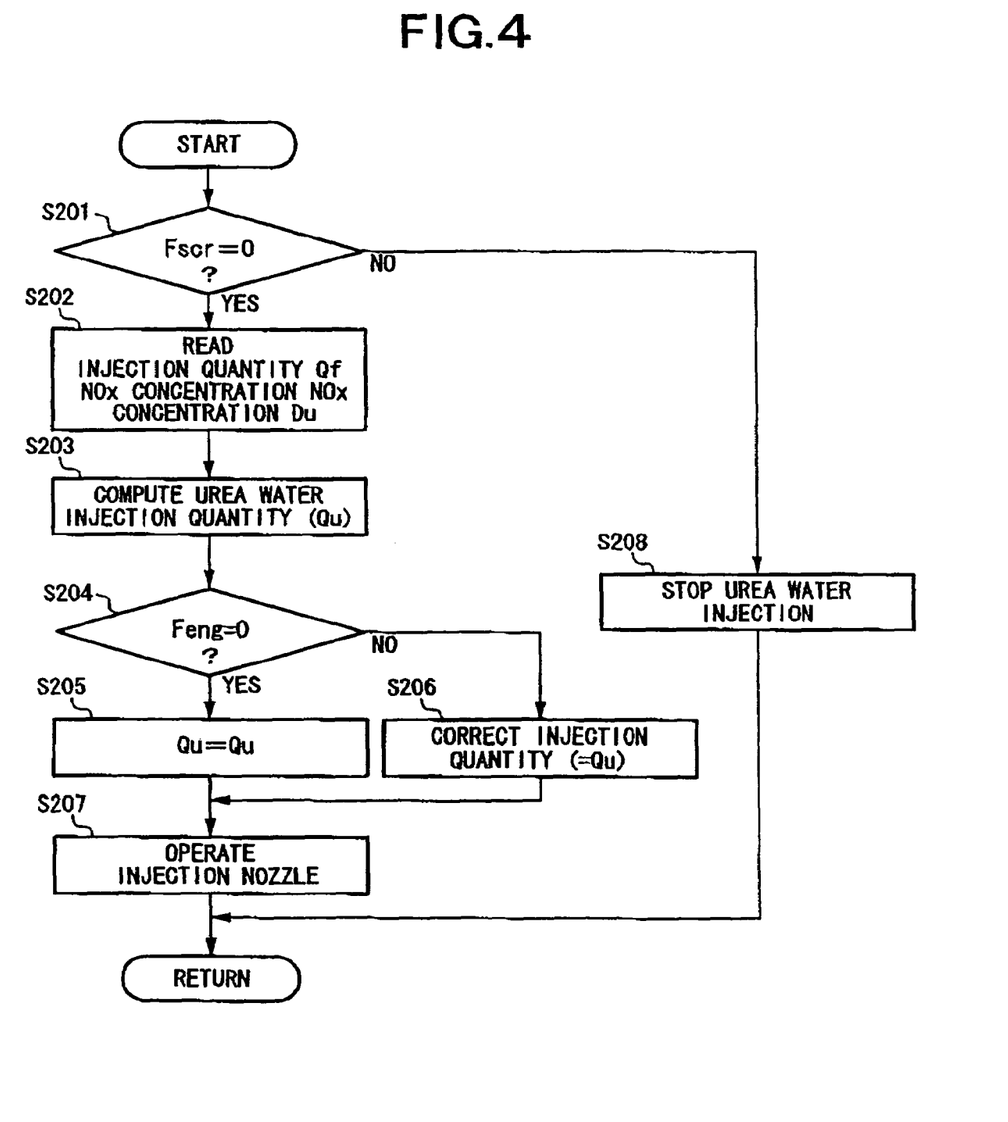
FIG. 4 is a flow chart of a urea water injection control routine.

FIG. 4 is a flow chart of a urea water injection control routine. This routine is executed for each predetermined interval.

In S201, the SCR side abnormality determination flag Fscr is read in, and it is determined whether or not the read flag Fscr is 0. If the flag is 0, control proceeds to S202, and if not 0, then it is determined that an abnormality has occurred in the urea water injection system, and control proceeds to S208.

In S202, the injection quantity Qf, the NOx concentration NOX (the output of the NOx sensor 73), and the concentration Du are read in.

In S203, the urea water injection quantity Qu is calculated. Calculation of the urea water injection quantity Qu is performed by calculating a basic injection quantity according to the injection quantity Qf and the NOx concentration NOX, and correcting the calculated basic injection quantity by the concentration Du. When the concentration Du is high, and hence the urea content amount per unit of injection quantity is large, a decrease correction is performed for the basic injection quantity. Conversely, when the concentration Du is low, and hence the urea content amount per unit of injection quantity is small, an increase correction is performed for the basic injection quantity.

In S204, the engine side abnormality determination flag Feng is read in, and it is determined whether or not the read flag Feng is 0. If the flag is 0, control proceeds to S205, and if not 0, then it is determined that an abnormality has occurred in the engine 1, and control proceeds to S206.

In S205, the urea water injection quantity Qu that has been calculated in S203 is set to an output value Qu.

In S206, correction according to the abnormality that has occurred in the engine 1 is performed for the urea water injection quantity Qu calculated in S203, and the corrected urea water injection quantity is set to the output value Qu. The mode of the abnormality that has occurred can be determined by inputting an identification signal corresponding to that mode, from the engine C/U 51. The trends of the change in NOx emission amount for each of the abnormalities in the engine 1 are determined beforehand by experiment, and in actual operation, the urea water injection quantity is changed according to the increase or decrease in NOx emission amount due to the abnormality that has occurred. For example, when the NOx emission amount has increased due to an abnormality, the urea water injection quantity is increased by an amount corresponding to the increase amount. Together with performing correction of the urea water injection quantity, control may be performed to switch a controlled variable map for engine parts from the one used at normal times, to suppress NOx formation itself.

In S207, an operation signal corresponding to the set output value Qu, is output to the injection nozzle 43.

In S208, urea water injection is stopped. This is because in a state where an abnormality has occurred in the urea water injection system, an accurate amount of urea water cannot be injected for the amount of NOx emission, and there is a possibility that NOx that has not been purified will be discharged into the atmosphere when the urea water injection quantity is smaller than the optimal value, and when the urea water injection quantity is greater than the optimal value there is a possibility not only that urea water will be unnecessarily consumed, but also that excessively produced ammonia will not be completely broken down by the ammonia purification catalyst 34, and will be discharged into the atmosphere. Moreover, this is because, naturally when the tank 41 is empty, or when the urea water is excessively diluted, or instead of the urea water, water or different kind of aqueous solution other than urea water is stored in the tank 41, ammonia in an amount required for NOx purification cannot be added.

Next, the operation of the engine C/U 51 is described.

Figure 5:
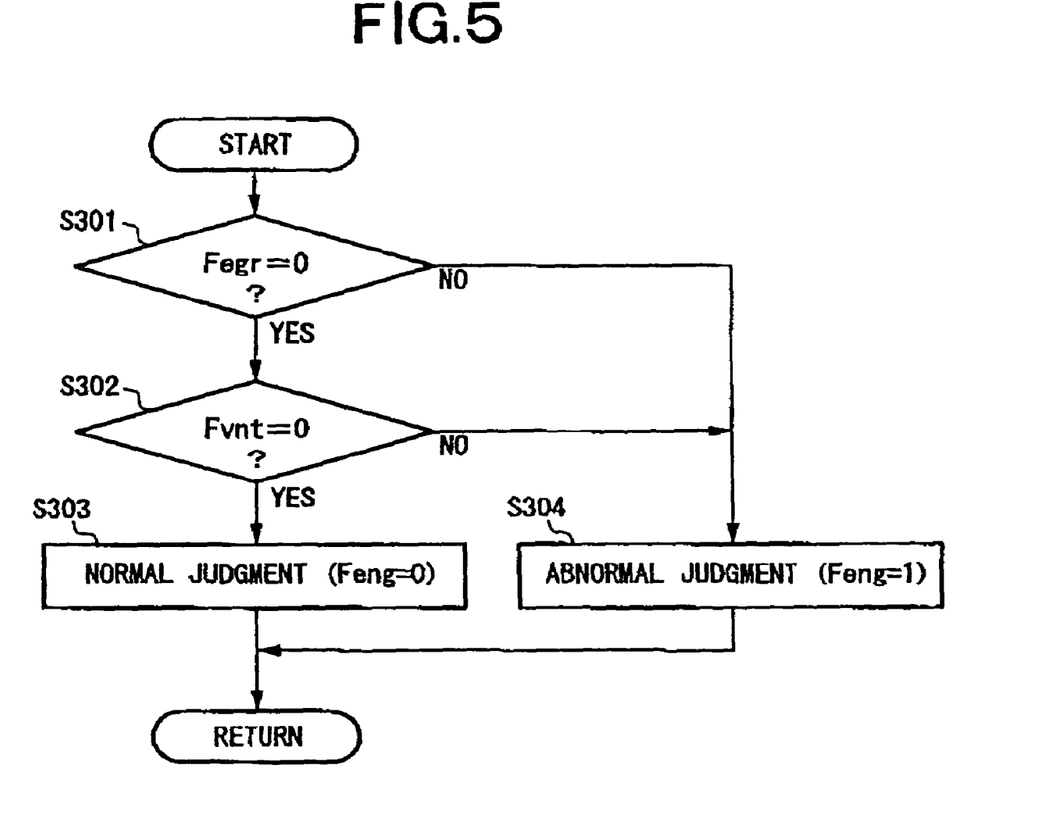
FIG. 5 is a flow chart of an abnormality detection routine performed by an engine C/U.

FIG. 5 is a flow chart of an abnormality detection routine. This routine is started by turning on the ignition switch, and is subsequently repeated for each predetermined interval. This routine detects an abnormality that has occurred in the engine 1.

In S301, it is determined whether or not an EGR system abnormality determination flag Fegr is 0. If the flag is 0, control proceeds to S302, and if 1, it is determined that an abnormality has occurred in the EGR system, and control proceeds to S304. An abnormality in the EGR system is detected by the EGR control unit 361. The EGR control unit 361 detects the voltage of a command signal output to the EGR valve 36, and when the detected voltage is greater than a predetermined value, it is judged that a disconnection has occurred in a control line of the EGR system, and the EGR system abnormality determination flag Fegr is set to 1.

In S302, it is determined whether or not a VNT system abnormality determination flag Fvnt is 0. If the flag is 0, control proceeds to S303, and if 1, it is determined that an abnormality has occurred in the VNT system, and control proceeds to S304. An abnormality in the VNT system is detected by the VNT control unit 122. The VNT control unit 122 detects an abnormality that has occurred in the VNT system, based on an intake air pressure detected by a boost sensor, when the detected air pressure deviates from a predetermined range that indicates normality. In the present embodiment, the boost sensor is installed in the surge tank 13, and detects the pressure inside the surge tank 13. The abnormalities in the EGR system and VNT system detected as described above correspond to a "second abnormality".

In S303, the engine side abnormality determination flag Feng is set to 0.

In S304, the engine side abnormality determination flag Feng is set to 1.

Figure 6:
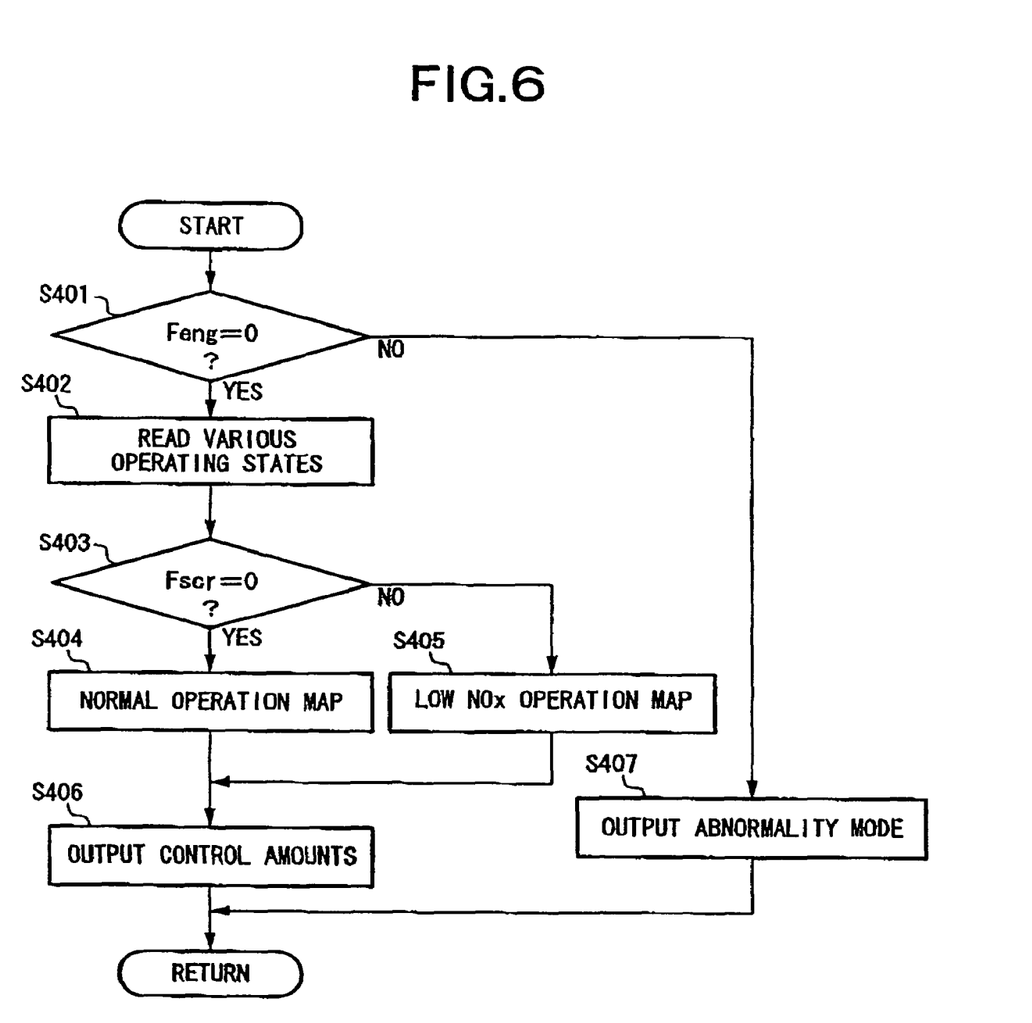
FIG. 6 is a flow chart of an engine control routine.

FIG. 6 is a flow chart of an engine control routine. This routine is executed for each predetermined interval.

In S401, the engine side abnormality determination flag Feng is read in, and it is determined whether or not the read flag Feng is 0. If the flag is 0, control proceeds to S402, and if not 0, it is determined that an abnormality has occurred in the engine 1, and control proceeds to S407.

In S402, various operating conditions used for control of the engine parts, such as the engine speed Ne and the accelerator opening APO are read in.

In S403, the SCR side abnormality determination flag Fscr is read in, and it is determined whether or not the read flag Fscr is 0. If the flag is 0, control proceeds to S404, and if not 0, it is determined that an abnormality has occurred in the urea water injection system, and control proceeds to S405.

In S404, the normal operation map is selected and the selected map is searched according to the read operating conditions, to calculate the controlled variables for the engine parts. In the present embodiment, the engine parts include the EGR valve 36, and the turbocharger 12, and the controlled variables to be calculated (that is, the engine control factors) include the opening of the EGR valve 36, and the angle of the variable vanes 121 (of the turbine 12*b*).

In S405, a low NOx operation map is selected and the selected map is searched according to the read operating conditions, to calculate the controlled variables for the engine parts. When an abnormality has occurred in the urea water injection system, then as mentioned before, the injection of the urea water is stopped. However, by selecting the low NOx operation map, NOx formation itself is suppressed to suppress the discharge of NOx into the atmosphere. In order to suppress NOx formation, for example, an EGR rate is increased (the opening of the EGR valve 36, and the angle of the variable vanes 121 are changed based on this increase), and the fuel injection conditions are changed. For example, injection timing is delayed in relation to the crank angle, and the injection pressure is reduced. Fluctuations in engine torque due to changes in the fuel injection conditions are suppressed by adjusting the injection quantity.

In S406, the calculated controlled variables are output to the engine parts control units 361 and 122.

In S407, an identification signal according to the mode of the abnormality that has occurred in the engine 1 is output to the SCR-C/U 61. For example, when the abnormality that has occurred is one related to the EGR system, an identification signal that indicates the occurrence of an abnormality in the EGR system is output. If an abnormality occurs in the EGR system, exhaust gas recirculation is stopped, and hence the amount of NOx emission increases. The SCR-C/U 61 increases the urea water injection quantity with respect to the amount of NOx emission to prevent the discharge of NOx into the atmosphere.

According to the present embodiment, the following effects can be obtained.

Firstly, when an abnormality occurs in the engine 1, and the amount of NOx emission changes, then according to this change, the urea water injection quantity is changed. Therefore the urea water injection quantity can be made to counterbalance the actual amount of NOx emission, and discharge of NOx due to insufficient urea water, and discharge of ammonia due to excessive urea water, can be prevented.

Secondly, when an abnormality occurs in the urea water injection system, the engine parts such as the EGR valve 36 are controlled so as to suppress NOx formation itself. Therefore discharge of NOx can be suppressed. In the present embodiment, in conjunction with the engine parts control, injection of the urea water is stopped. Therefore a situation where urea water is excessively injected due to unstable operation, so that ammonia is discharged can be prevented.

Thirdly, as an abnormality in the urea water injection system, in addition to an abnormality of parts such as the injection nozzle 43, urea water abnormalities, such as insufficient residual quantity and dilution are adopted, and when an occurrence of these abnormalities is detected, a warning lamp is operated. Therefore, the operator can be prompted to appropriately maintain and manage the urea water.

In the above, ammonia is produced as a result of urea being hydrolyzed. However, a catalyst for hydrolyzing the urea is not particularly specified. In order to improve the hydrolysis efficiency, a catalyst for the hydrolysis may be arranged upstream of the NOx reduction catalyst (that is, the NOx purification catalyst 33).

Furthermore, in the above, abnormalities that occur in the EGR system and the VNT system are adopted as the second abnormalities. However, in addition to these abnormalities, abnormalities that occur in the fuel supply injector, or the fuel supply system for supplying fuel to the injector may be adopted. As an abnormality that occurs in the injector, for example, an occurrence of a disconnection of a control line can be determined when weak electric current flows to the injector, and the electric current actually flowing at that time is smaller than a predetermined value. Moreover, as an abnormality that occurs in the fuel supply system, for example, the occurrence of a failure in the fuel pump can be determined when the pressure inside the common rail 22 is detected, and the detected pressure is smaller than a predetermined value.

A diesel engine other than a direct injection type, or a gasoline engine may be used for the engine.

In the above, the present invention has been described using some preferable embodiments. However, the scope of the present invention is not limited by the above description in any way, and is to be determined based on the description of the claims, in accordance with the applicable text.

We claim:

1. An engine exhaust emission control device comprising: an addition device configured to add a NOx reducing agent to exhaust gas of an engine;
   a first controller configured to control the addition device; and
   a second controller configured to set an engine control factor that influences the composition of exhaust gas at the point in time of emission from a cylinder of the engine, and output a command signal that corresponds to the set engine control factor, wherein
   the second controller is further configured to detect an abnormality that occurs in an exhaust gas recirculation device or a supercharger arranged in the engine as an engine part for realizing the engine control factor, if the abnormality is detected, outputs to the first controller, an addition device control signal for making a reducing agent addition amount by the addition device vary from that at normal addition control times, other than at the time of the abnormality occurrence, and
   the abnormality occurs when a detected voltage of the command signal output to the exhaust gas recirculation device is greater than a predetermined value, or when a detected value of intake air compressed by the supercharger deviates from a predetermined pressure range.

2. An engine exhaust emission control device according to claim 1, wherein the second abnormality occurs in a fuel injector that supplies the engine with fuel or a fuel pump that supplies fuel to the fuel injector.

3. An engine exhaust emission control device according to claim 2, wherein the first controller receives the addition device control signal and reduces the reducing agent addition amount corresponding to a reduction in the NOx emission amount related to the abnormality, and increases the reducing agent addition amount corresponding to an increase in the NOx emission amount related to the abnormality.

4. An engine exhaust emission control device according to claim 1, wherein the addition device comprises:

a tank configured to store an aqueous solution of the NOx reducing agent or a precursor thereof; and an injection nozzle disposed on an exhaust passage of the engine, the injection nozzle injecting the reducing agent or precursor aqueous solution stored in the tank, to add the NOx reducing agent to the exhaust gas.

5. An engine exhaust emission control device according to claim 4, wherein urea water is stored it the tank.

6. An engine exhaust emission control device according to claim 1, wherein the NOx reducing agent is ammonia.

7. An engine exhaust emission control device comprising:
an addition device configured to add a NOx reducing agent to exhaust gas of an engine;
a first controller configured to control the addition device and to detect a first abnormality in the addition device; and
a second controller configured to set an engine control factor that influences the composition of exhaust gas at the point in time of emission from a cylinder of the engine, to output a command signal that corresponds to the set engine control factor, and to detect a second abnormality in an exhaust gas recirculation device or a supercharger arranged in the engine as an engine part for realizing the engine control factor, wherein
the second abnormality occurs when a detected voltage of the command signal output to the exhaust gas recirculation device is greater than a predetermined value, or when a detected pressure of intake air compressed by the supercharger deviates from a predetermined range,
if the first abnormality is detected, the first controller outputs to the second controller, an engine control signal for making a NOx emission amount of the engine vary from that at normal engine operation times, other than at the time of the first abnormality occurrence, under the same operating conditions of the engine, and
if the second abnormality is detected, the second controller outputs to the first controller, an addition device control signal for making a reducing agent addition amount added by the addition device vary from that at normal addition control times, other than at the time of the second abnormality occurrence.

8. An engine exhaust emission control device according to claim 7, wherein the first controller outputs an engine control signal for reducing the NOx emission amount of the engine to less than at normal engine operation times, at the time of the first abnormality occurrence.

9. An engine exhaust emission control device according to claim 8, wherein the first controller stops addition of the reducing agent by the addition device, along with outputting of the engine control signal.

10. An engine exhaust emission control device according to claim 7, wherein the addition device comprises:
a tank configured to store an aqueous solution of the NOx reducing agent or a precursor thereof, and
an injection nozzle disposed on an exhaust passage of the engine, the injection nozzle configured to inject the reducing agent or precursor aqueous solution stored in the tank, to add the NOx reducing agent to the exhaust gas.

11. An engine exhaust emission control device according to claim 10, wherein urea water is stored in the tank.

12. An engine exhaust emission control device according to claim 10, further comprising a first sensor configured to detect a concentration of the reducing agent or a precursor contained in the reducing agent or precursor aqueous solution stored in the tank, and the first controller detects as the first abnormality, a situation where a value of the concentration detected by the first sensor deviates from a predetermined range.

13. An engine exhaust emission control device according to claim 10, further comprising a second sensor configured to detect a residual amount of the reducing agent or precursor aqueous solution stored in the tank, and the first controller detects as the first abnormality, a situation where a value of the residual amount detected by the second sensor is less than a predetermined value.

14. An engine exhaust emission control device according to claim 7, wherein the NOx reducing agent is ammonia.

15. An engine exhaust emission control device according to claim 7, wherein the second abnormality occurs in a fuel injector that supplies the engine with fuel or a fuel pump that supplies fuel to the fuel injector.

16. An engine exhaust emission control device according to claim 15, wherein the first controller receives the addition device control signal and reduces the reducing agent addition amount corresponding to a reduction in the NOx emission amount related to the second abnormality, and increases the reducing agent addition amount corresponding to an increase in the NOx emission amount related to the second abnormality.

17. An engine exhaust emission control method, comprising the steps of:
providing a reducing agent addition device to add a NOx reducing agent to exhaust gas of an engine,
setting an engine control factor that influences the composition of exhaust gas at the point in time of emission from a cylinder of the engine,
outputting a command signal that corresponds to the set engine control factor to an engine part for realizing the engine control factor,
detecting an abnormality that occurs in an exhaust gas recirculation device or a supercharger as the engine part
increasing or decreasing a reducing agent addition amount by the reducing agent addition device than that at normal addition control times, other than at the time of the second abnormality occurrence when the occurrence of this abnormality is detected, corresponding to modes of the abnormality, wherein the detection step includes:
detecting a voltage of the command signal output to the exhaust gas recirculation device,
detecting a pressure of intake air compressed by the supercharger, and
detecting the occurrence of the abnormality when the detected voltage is greater than a predetermined value or the detected pressure deviates from a predetermined range.

18. An engine exhaust emission control method, comprising the steps of:
providing a reducing agent addition device to add a NOx reducing agent to exhaust gas of an engine;
at normal times, adding the reducing agent in an amount corresponding to operating conditions of the engine by the reducing agent addition device, setting an engine control factor that influences the composition of exhaust gas at the point in time of emission from a cylinder of the engine, and outputting a command signal that corresponds to the set engine control factor to an engine part for realizing the engine control factor;
detecting a first abnormality in the reducing agent addition device;

detecting a second abnormality in an exhaust gas recirculation device or a supercharger arranged in the engine as the engine part;

if the first abnormality is detected, manipulating the engine control factor to reduce a NOx emission amount of the engine from that at normal times; and if the second abnormality is detected, increasing or decreasing the reducing agent addition amount added by the reducing agent addition device from that added at normal times, corresponding to modes of the second abnormality, wherein detecting the second abnormality includes:
　　detecting a voltage of the command signal output to the exhaust gas recirculation device,
　　detecting a pressure of intake air compressed by the supercharger, and
　　detecting the occurrence of the abnormality when the detected voltage is greater than a predetermined value or the detected pressure deviates from a predetermined range.

* * * * *